Figure 1:
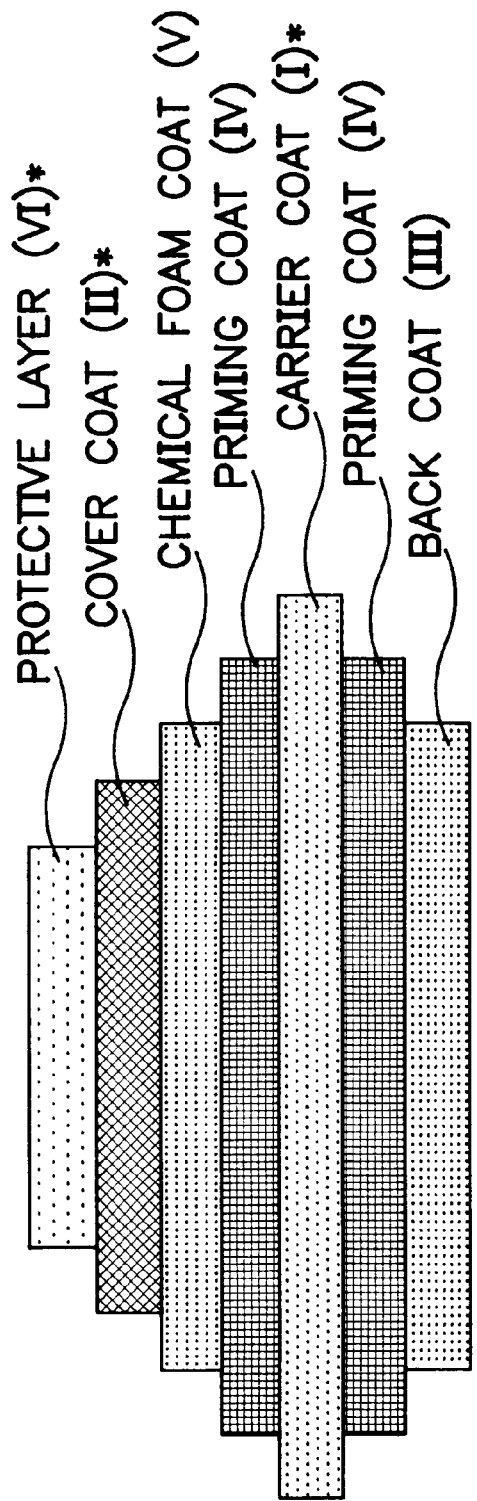

United States Patent

Edinger et al.

[11] Patent Number: 5,932,337
[45] Date of Patent: Aug. 3, 1999

[54] FLAT STRUCTURE MADE OF RENEWABLE RAW MATERIALS

[75] Inventors: Sabine Edinger, Lauffen; Ditmar Schulz, Weinsberg; Susanne Baumgartner, Ludwigsburg; Bernd Kastl, Bietigheim-Bissingen; Frank Mauer, Ludwigsburg, all of Germany

[73] Assignee: DLW Aktiengesellschaft, Germany

[21] Appl. No.: 08/849,646

[22] PCT Filed: Nov. 15, 1995

[86] PCT No.: PCT/EP95/04496

§ 371 Date: May 14, 1997

§ 102(e) Date: May 14, 1997

[87] PCT Pub. No.: WO96/15203

PCT Pub. Date: May 23, 1996

[30] Foreign Application Priority Data

Nov. 15, 1994 [DE] Germany .............................. 44 40 860
Nov. 13, 1995 [DE] Germany .............................. 195 42 274

[51] Int. Cl.⁶ .............................. B32B 5/32; B32B 27/38; C09D 163/00
[52] U.S. Cl. .............................. 428/319.3; 428/413; 428/414; 428/480
[58] Field of Search .............................. 428/319.3, 413, 428/414, 480

[56] References Cited

U.S. PATENT DOCUMENTS 3,819,438 6/1974 Witman ........................................ 156/79
5,082,708 1/1992 Kauffman et al. ........................ 428/47

FOREIGN PATENT DOCUMENTS

| 0 539 916 | 5/1993 | European Pat. Off. . |
| 0381971 | 5/1994 | European Pat. Off. . |
| 0539916 | 4/1997 | European Pat. Off. . |
| 1 494 405 | 3/1970 | Germany . |
| 39 03 669 | 7/1990 | Germany . |

*Primary Examiner*—Blaine R. Copenheaver
*Attorney, Agent, or Firm*—Dick and Harris

[57] ABSTRACT

The invention discloses a planar structure composed of at least one carrier layer (I) and at least one transparent cover coat (II); an optional back coat (III) arranged under the carrier coat (I) and made of a chemically or mechanically foamed expanded layer; and an optional compact or priming coat (IV) arranged between carrier layer (I) and cover coat (II) and/or between carrier layer (I) and back coat (III), wherein the coating compounds for the layers (II), (III), (IV) can be manufactured from a combination of:

a) epoxidized products of esters of unsaturated fatty acids having a chain length of $C_8$ to $C_{22}$ with multi valent aliphatic alcohols containing 2 through 6 carbon atoms; and which contain more than one epoxy group per molecule on average; and b) sub-esters of polycarboxylic acids with polyetherpolyols that contain at least one free carboxylic acid group per molecule and a double bond;

c) optionally, a hydrophobing agent; and d) optionally, further additives from the group consisting of fillers, pigments, expanders and, auxiliary substances;

whereinby the constituents, (a) and (b) are employed in a weight ratio of 0.6:1 to 1:1.4.

36 Claims, 1 Drawing Sheet

\* layers according to one embodiment of the present invention

* layers according to one embodiment of the present invention

FLAT STRUCTURE MADE OF RENEWABLE RAW MATERIALS

The invention is directed to the subject matter recited in the patent claims.

The invention is particularly directed to a multi-layer planar structure made from renewable raw materials such as, for example, floor coverings or tiles. The inventive planar structure is composed of a carrier layer (I) and of at least one transparent cover coat, for example, the wear layer. Further, a back coat, and optionally a compact coat or priming coat arranged between the carrier layer and the cover coat and/or between carrier layer and back coat can be provided in the inventive surface structure. Optionally, a chemically foamed layer can also be arranged under the cover coat. This chemically foamed layer can be chemically embossed.

The invention is therefore particularly directed to softener-free floor coverings based on renewable raw materials, with optional chemically or mechanically foamed foam layers, which can also be chemically embossed.

Due to their wide range of decorative possibilities, far-reaching resistance to wear, easy care and inexpensive nature, PVC plastic coverings are currently employed to great extent.

CV (cushion vinyls) floor coverings are manufactured from PVC plastisols in a coating process on a carrier layer or release paper support and subsequent gelling. The plastisols are composed of PVC particles, softeners, stabilizers and standard auxiliaries and fillers that sinter together to form a matrix in the gelling oven.

A layer can also be additionally thermally foamed by adding chemical foaming agents, wherein additional structuring can be achieved by applying inhibitors to specific areas.

Of course, mechanical foams can also be used in these coverings, as is generally known and shown later in examples.

It is also possible to vary the properties within extremely broad scope by applying a plurality of layers having different composition.

Although PVC is an ideal material in terms of its economic feasibility and its properties, the ecological aspects—avoiding volatile softeners and solvents (VOC) and products containing halogens, as well as, recyclability—which are being taken more and more into consideration, make it necessary to search for floor coverings that are free of PVC and softener.

For technical and economical reasons, however, it is meaningful to retain the existing production equipment.

Further, the floor covering should also be patternable and should be composed of different layers of which one or more are foamed.

The above-described demands have hitherto not been satisfied by any known system.

It is known according to what is referred to as the Furukawa method to manufacture crosslinked PE foams in which polyethylene, azodicarbonamide and dicumene peroxide are extruded with the assistance of an extruder and a sheet die to form a film or a sheet, wherein the extrusion must ensue at a temperature at which the PE is liquid but at which the crosslinking agent and the foaming agent are not yet decomposed.

The polyethylene is foamed in a subsequent foaming furnace and is simultaneously crosslinked.

An economical manufacture of floor coverings, however, is not established according to this method.

It is also known that mixtures of EVA with PE or pure EVA can be mixed with fillers, activators, expanders and, optionally, crosslinking agents below 100° C. After these mixed compounds are granulated and filled into forms, parts that are thermally foamed and have a complicated shape can be obtained therefrom by heating to the decomposition temperature of the expander.

Unfortunately, this method can only be applied for smaller parts.

It is also known to produce softener-free polyurethane foams by mechanically foaming the components by the compressed introduction of air; however, the foaming can not be inhibited within this method and a structure cannot be produced as a result thereof.

DE 39 03 669 A1 also discloses how a floor covering of polymethylmethacrylate, softeners and the standard fillers and additives can be manufactured similar to a PVC-CV floor covering. What is disadvantageous about this method, among others things, however, is the relatively high proportion of softener in the floor covering.

A floor covering that has been known for a long time and is likewise based on renewable raw materials is linoleum. The partly complicated and lengthy method for manufacturing linoleum is described in detail in *Ullmanns Enzyklopaedie*, Vol. 12 (1976), pages 22 ff., and *Encycl. of Pol. Sci. and Tech.*, Vol. 1, 1964, pages 403 ff.

Due to the complex manufacturing method, a number of attempts have already been made to accelerate the manufacturing and maturing process of linoleum.

EP 0174042 and EP 0228116 disclose two-component systems that are suitable for processing on standard systems for linoleum manufacture but that are not suitable for the coating process.

For technical reasons, the compounds disclosed by DE 2241535 A1 also do not come into consideration for the desired and demanded application. Compounds having normal aliphatic carboxylic acid groups such as, for example, citric acid esters serve as cross-linkers herein. These cannot meet the demand that they are already tack-free after the cited, short heating times on continuously operating coating systems. Further, citric acid esters, i.e., monoalkyl esters of citric acid or polycitric acid esters with higher alcohols having a chain length of $C_8$ to $C_{22}$ are extremely expensive substances due to their manufacturing process.

DE 4135664 A1 discloses coating compounds that are based on renewable raw materials and are used to coat textile planar structures or release paper. The coating compounds are composed of a combination of a) epoxidized products of esters of unsaturated fatty acids having a chain length of $C_8$ to $C_{22}$ having multi-valent, aliphatic alcohols containing 2 to 6 carbon atoms; and having more than one epoxy group per molecule on average; and b) sub-esters of polycarboxylic acids with polyetherpolyols; having at least two free carboxylic acid groups per molecule and having a double bond in the $\alpha,\beta$ position with respect to the free carboxylic acid groups; and c) a hydrophobing agent.

In the examples of DE 4135664 A4, epoxidized linseed oil (18.1 g) is employed as constituent a) and a half-ester of maleic acid anhydride and dipropyleneglycol (16 g) is utilized as constituent b) in a molar ratio of 0.1:1 to 1:1.2.

As an example, DE 41 35 664 A1 discloses a floor covering having a first layer that, contains epoxidized linseed oil and half-ester of maleic acid anhydride and dipropyleneglycol together with 20% kaolin and 9% stearate—with reference to the quantity of the former two constituents; a second layer made from the same epoxidized linseed oil and half-ester of maleic acid with polypropyleneglycol together with, with reference to the quantity of these two constituents, 23% kaolin and 8% stearate and into which a glassfiber non-woven is laminated and rolled; and a cover coat, wherein the covering is solidified at 150° C. to 180° C. What is disadvantageous, however, is that the uppermost layer of this covering is extremely rough and non-transparent. Further, no foaming agents are contained in the described formulations; they can thus be neither chemically nor mechanically foamed. The described back coatings (Example 2) require complicated manufacture with expensive release paper; they comprise no foam and thus have no cushioning effect. It has also been shown that the surface of said coverings is not adequately dirt-repellant and exhibit poor curing.

It is therefore an object of the invention to provide an improved planar structure made from renewable raw materials that avoids the above disadvantages and that, moreover, optionally comprises a layer that can be patterned. Further, a multi-layer covering of coating compounds should be formed, wherein at least the compound for one layer is chemically or mechanically foamable and wherein the overall structure can also be manufactured in a simple way.

This object is achieved by the planar structure according to patent claim 1.

Advantageous embodiments of the invention are contained in the subclaims.

The invention is therefore directed to a planar structure composed of at least one carrier layer (I) and of at least one transparent cover coat (II); an optional back coat (III) arranged under the carrier coat (I) and made of a chemically or mechanically foamed foam layer; and an optional compact or priming coat (IV) arranged between the carrier layer (I) and the cover coat (II) and/or between the carrier layer (I) and the back coat (III), wherein the coating compounds for the layers (II), (III), (IV) can be manufactured from a combination of:
  a) epoxidized products of esters of unsaturated fatty acids having a chain length of $C_8$ to $C_{22}$ with multi valent aliphatic alcohols containing 2 through 6 carbon atoms; and which contain more than one epoxy group per molecule on average; and
  b) sub-esters of polycarboxlic acids with polyetherpolyols that contain at least one free carboxylic acid group per molecule and a double bond;
  c) optionally, a hydrophobing agent; and
  d) optionally, further additives from the group consisting of fillers, pigments, expanders and auxiliary substances;
wherein the constituents, (a) and (b) are employed in a weight ratio of 0.33:1 to 3.15:1, especially in a weight ratio of 0.6:1 to 1:1.4.

A floor covering similar to a CV is therefore inventively produced without employing PVC or softeners. It was found that, surprisingly, the mechanical properties as well as the dirt repellant properties of the inventive planar structure, i.e. of the floor covering or of the tiles, were capable of being further enhanced by the employment of cure accelerators (siccatives).

With respect to the cure accelerators (siccatives), it was found that surprisingly, a combination of cerium and cobalt or, on the other hand, a combination of cobalt, lithium and calcium or a combination of manganese, lithium and calcium exhibits especially good effects, i.e. the hardening process of the mixtures was accelerated and extremely good dirt-repellant properties of the inventive covering were achieved.

The inventive planar structure, i.e. the floor coverings or the tiles, are manufactured such that a combination of the aforementioned constituents a) and b) mixed in the weight ratio of 0.33:1 to 3.15:1, particularly 0.6:1 to 1.2:1, as well as fillers and, in the case of the compound for the cover coat, optionally at least 15 weight per cent hydrophobing agent, and in the case of the compound for a chemical foam, a foaming agent, and optionally a foam stabilizer for each foam compound, is mixed and processed to form a paste, and these pastes are then processed in a known way to form multi-layer floor coverings.

Except for the cover coat (up to a maximum of 2% silicic acid), the coat pastes for the inventive planar structure all contain greater quantities of filler, namely ratios of filler to mixture of oil and sub-ester, of 30:100 to 75:100, particularly 40:100 to 60:100, wherein 20:100 to 45:100, particularly 40:100 is used in the compact coat, and 60:100 to 100:100, preferably 80:100 are used in the chemical foam, whereas relatively little, ratios of no more than 10:100, for example 1:100 to 10:100 (no more than even 5:100 is preferred) of filler are usually contained in the compounds for the mechanical foam. All ratios refer to the total quantity of epoxidized oil and sub-ester, when not specified to the contrary.

The cover coat should be transparent so that the layer lying therebelow can then be printed on, and a printed planar structure is obtained that has high mechanical strength and extremely good dirt-repellant properties. A multi-layer covering having a parquet pattern as well as enameled cloth and synthetic leather or protective layers for glass can be cited as examples of such an employment.

The coverings thus contain comparatively high proportions of additives, particularly mineral fillers from the group of chalk, barium sulfate, silicic acid, kaolin and talcum but also comparatively high proportions of sawdust, cork dust, ground glass, textile filaments or plant fibers, which can also be present in the mixture, wherein the quantity of filler in the overall floor covering can amount to up to 70 weight percent, (preferably 30 to 60 weight percent) in the case of foam-free coverings, and preferably 40 to 60 weight percent of the overall floor covering in the case of floor coverings having chemically foamed layers.

With respect to compounds for the chemically foamed layers, the quantity of foaming agent lies in the standard range up to approximately 25 weight percent, especially up to 15 weight percent, and other standard auxiliaries can amount, for example, up to 15 weight percent.

The floor coverings are preferably composed of three, four or five layers, namely a compact coat, an optional chemical foam coat, a transparent cover coat and a carrier coat and, optionally, a chemically foamed back coat, wherein the chemical foam, of course, can also be replaced by a mechanical foam or wherein both types of foam can be present. When the chemically foamed layer is arranged between the compact coat and the cover coat, this can be chemically embossed in a specific embodiment of the invention. To that end, a paste is applied on the compact coat. This paste contains an expander and a kicker; what is meant by this are polyols, urea, zinc, lead or cadmium compounds, whereby ZnO is preferred. These lower the decomposition temperature of the expander. The paste coat is then crosslinked below the decomposition temperature of the expander. In the next fabrication stage, the coated paste is provided with a rotogravure pattern. An inhibitor is added to the inks that should be dark in the finished covering. The inhibitor weakens the effect of the kicker or entirely cancels it, so that the decomposition of the expander is shifted towards higher temperatures. Suitable substances having inhibitor effect are, for example, benzotriazol derivatives, trimellitic acid anhydrides and the like. Various relief depths can be achieved by varying the quantity of added inhibitor. A protective layer of polymer or, respectively, copolymerizates or waxes can then be arranged over the chemically foamed layer with applied relief pattern. This is advantageous because the multi-layer covering is alkali-sensitive and a protective layer of (co)polymer, i.e. of unsaturated, hardenable lacquer systems is extremely advantageous. Examples of these unsaturated, hardenable lacquer systems are polyacrylates, polymethacrylates, polyurethanes and mixtures thereof.

However, carnauba wax can also be utilized. The protective layer should be manufactured from (co)polymers compatible with the cover coat.

As already set forth above, the manufacture of the inventive floor coverings can ensue analogously to the manufacture of corresponding PVC coverings.

In particular, this is a matter of a continuous process that, similar to CV manufacture, successively describes an overall structure of a floor covering with different pastes. As already mentioned, such a method can also comprise foaming, particularly chemical foaming, and leads to a covering that can be printed.

The constituent a) is an epoxidized product of a natural, unsaturated fat or oil and the constituent b) is composed of sub-esters of polycarboxylic acids, for example those having double bonds, with polyethylene glycols, wherein the chain length of the polyethylene glycol comprises 2 to 10 ethylene oxide units and the sub-esters still contain at least one free carboxylic acid group. In another embodiment of the invention, sub-esters of polycarboxylic acids with polyether-polyols can also be utilized as constituent b). These contain at least two free carboxylic acid groups per molecule and have a double bond in the $\alpha$, $\beta$ position with respect to the free carboxylic acid group.

Preferred constituents b), namely, are sub-esters of polycarboxylic acids with polytetramethyleneglycol ethers or of polycarboxylic acids with polyisobutyleneglycols, also having a chain length of 2 to 10.

Maleic acid or maleic acid anhydride or itaconic acid particularly come into consideration as polycarboxylic acid in constituent b).

The manufacture of the covering ensues, for example, in that the constituents are mixed to form a paste, applied in an appropriate thickness on a web with coating devices, optionally foamed and solidified in a known way. Layers containing foaming agent and free of foaming agent can also be united to form a web and can be foamed and solidified simultaneously or in successive steps.

An especially preferred material for constituent b) is a sub-ester made by The. Boehme KG, Geretsried that can be obtained under the name Ateval® VNR 1 and that is a 2-butene dicarboxylic acid-oxo-bis (methyl-2, 1→ethandioyl) ester.

Acrylates such as, for example, polymethyl methacrylate are to be understood as being auxiliaries in the scope of the present invention. These are worked into the wear layer in order to improve the adhesion between the applied ultraviolet lacquer and the wear layer, i.e. the cover coat. Linseed oil in amounts of 1 to 16 weight percent, especially in amounts of 1 to 1 0 weight percent can also be contained in the cover coat as an auxiliary.

1 to 5 percent of azodicarboxylic acid amide or sulfohydrazides can be employed as foaming agent within the scope of the invention, wherein, in particular, 3 weight percent of foaming agent are preferred. As already mentioned above, kickers can also be utilized in the chemical embossing process in order to lower the decomposition temperature of the foaming agent. In particular, zinc oxide is inventively utilized here.

The following examples explain the invention. They show various pastes, namely in the preferred range of the constituents as in the respective exemplary embodiment:

EXAMPLE 1

Compact Coat

| | |
|---|---|
| Ateval ® VNR 1 | 40 through 60 kg, particularly 50 kg |
| epoxidized soy oil | 35 through 80 kg, particularly 40 kg |
| epoxidized linseed oil | 20 through 46 kg, particularly 25 kg |
| calcium carbonate | 20 through 50 kg, particularly 40 kg |
| titanium dioxide | 5 through 20 kg, particularly 5 kg. |

EXAMPLE 2

Chemical Foam

| | |
|---|---|
| Ateval ® VNR 1 | 40 through 60 kg, particularly, 50 kg |
| epoxidized soy oil | 20 through 35 kg, particularly 25 kg |
| epoxidized linseed oil | 40 through 60 kg, particularly 50 kg |
| mixture of foaming agents | 2 through 25 kg, particularly 12 kg |
| calcium carbonate | 60 through 100 kg, particularly 80 kg |

EXAMPLE 3

Transparent Cover Coat

| | |
|---|---|
| Ateval ® VNR 1 | 40 through 60 kg, particularly 50 kg |
| epoxidized linseed oil | 20 through 58 kg, particularly 27 kg |
| linseed oil | 2 through 10 kg, particularly 3 kg |
| silicic acid | 2 through 5 kg, particularly 2 kg |
| polymethylmethacrylate | 1 through 5 kg, particularly 2 kg |
| cure accelerators (siccatives) | $2 \times 10^{-1}$ through $10^{-2}$% metal content, particularly $10^{-1}$% |
| optionally: Hoechst Wachs E (Montanwax, i.e. ester of montanic acid) | 12 through 34 kg, particularly 22 kg |

EXAMPLE 4

Mechanical foam

| | |
|---|---|
| Ateval ® VNR 1 | 40 through 60 kg, particularly 50 kg |
| epoxidized soy oil | 30 through 43 kg, particularly 35 kg |

| | |
|---|---|
| epoxidized linseed oil | 15 through 27 kg, particularly 20 kg, |
| foam stabilizer | 1.5 through 3 kg, particularly 2 kg |
| titanium dioxide | 1 through 5 kg, particularly 2 kg |

In the case of this paste, reaction times (reaction and foaming times) of 2 to 1 2 minutes are used in the manufacture of the floor covering webs. The required temperatures lie between 140 and 200° C., preferably 170 to 190° C. Once the webs have been cooled, they subsequently prove to be dry and no longer tacky, so that they can be supplied directly for sizing and packaging.

Example of an inventive composition:

| | |
|---|---|
| carrier | 60 g/m$^2$ |
| priming coat | 400 g/m$^2$ |
| chemical foam coat | 550 g/m$^2$ |
| cover coat | 400 g/m$^2$ |
| back coat | 1200 g/m$^2$ |

FIG. 1 shows an inventive, multi-layer planar structure as an example. The layers that are compulsory are thereby particularly identified with "*".

The above values are valid for ordinary floor coverings having deviations of ±25%. The floor covering should normally have a thickness of 1.1 through 3 mm, particularly approximately 2 mm.

When, however, an especially good damping of foot steps is desirable, the foam layer should be especially thick. A thickness of the foam coat of 0.3 mm can be recited for a composite covering with foam coat, this yielding an approximately 0.9 mm thick foam coat after the crosslinking and foaming. This layer can be inventively increased without further ado and the thicknesses of the other layers can be correspondingly reduced in order, for example, to adhere to an overall thickness of 2 mm.

For the patterning or, respectively, structuring of the surface, a mechanical embossing, chemical embossing or silkscreening (roto screening process) can be provided.

Inventively, the cover coat is made free of filler or practically free of filler, so that it is transparent and the layer lying therebelow can therefore be printed on before application of the cover coat and the transparent cover coat can then be applied in standard manufacturing systems for floor coverings.

We claim:

1. A planar structure composed of at least one carrier layer (I), and at least one transparent cover layer (II) including a coating compound, wherein the coating compound for the at least one cover layer (II) is manufactured from a combination of:
    (a) epoxidized products of esters of unsaturated fatty acids having a chain length of $C_8$ to $C_{22}$ with multi valent aliphatic alcohols containing 2 to 6 carbon atoms and containing more than one epoxy group per molecule on average; and
    (b) half-esters of polycarboxylic acids with polyetherpolyols that contain at least one free carboxylic acid group per molecule and a double bond;
wherein the constituents (a) and (b) are employed in the cover layer (II) in a weight ratio of 0.33:1 to 1.45:1 and wherein siccatives are present in a weight ratio of $2 \times 10^{-1}$ to $1 \times 10^{-2}$% metal content, to the total amount of epoxidized oil and half-ester in the cover layer (II).

2. The planar structure according to claim 1, wherein the constituents (a) and (b) are employed in a weight ratio of 0.6:1 to 1:1.4.

3. The planar structure according to claim 1, wherein the polycarboxylic acid of constituent (b) has 2 to 10 carbon atoms.

4. The planar structure according to claim 3, wherein the polycarboxylic acid is a dicarboxylic acid.

5. The planar structure according to claim 4, wherein the dicarboxylic acid is selected from the group consisting of itaconic acid, maleic acid, fumaric acid, the anhydrides thereof, and mixtures thereof.

6. The planar structure according to claim 1, wherein a hydrophobing agent is contained in the compound for the cover layer (II).

7. The planar structure according to claim 1, wherein 10 to 57 weight percent of hydrophobing agent is contained in the compound for the cover layer (II), to the total amount of epoxidized oils and half-ester.

8. The planar structure according to claim 7, wherein 12 to 34 weight percent of hydrophobing agent is contained in the compound for the cover layer (II), to the total amount of epoxidized oils and half-ester.

9. The planar structure according to claim 1, wherein no more than 8 weight percent filler is contained in the coating compound for the cover layer (II).

10. The planar structure according to claim 9, wherein no more than 2 weight percent filler is contained in the coating compound for the cover layer (II).

11. The planar structure according to claim 1, wherein the compound for the cover layer (II) further contains additives from the group consisting of fillers, pigments, expanders and auxiliary substances.

12. The planar structure according to claim 1, wherein other processing-conditioned auxiliary substances from the group of acrylates, polymethylmethacrylates, linseed oil, curing accelerators, foaming agents and kickers are present in the coating compounds in quantities up to 16 weight percent.

13. The planar structure according to claim 1, wherein the planar structure contains at least one compound of metal from the group consisting of Al, Li, Ca, Fe, Mg, Mn, Pb, Zn, Zr, Ce, Co, and combinations thereof.

14. The planar structure according to claim 1, wherein siccatives in a weight ratio of $1 \times 10^{-1}$% metal content, to the total amount of epoxidized oil and half-ester are present in the coating compound for the cover layer (II).

15. The planar structure according to claim 1, further comprising a chemical foam layer (V) for chemical embossing disposed under the cover layer (II).

16. The planar structure according to claim 1, further comprising a protective layer (VI) of at least one unsaturated, hardenable lacquer material disposed above the cover layer (II), wherein the polymers or copolymers for the lacquer material are selected from the group of polyacrylates, polymethacrylates, polyurethanes and mixtures thereof.

17. The planar structure according to claim 1, further comprising a back layer (III) disposed under the carrier layer (I) and made from a chemically or mechanically foamed foam layer; wherein a coating compound for the layer (III) is manufactured from a combination of:
    (a) epoxidized products of esters of unsaturated fatty acids having a chain length of $C_8$ to $C_{22}$ with multi valent aliphatic alcohols containing 2 to 6 carbon atoms and which contain more than one epoxy group per molecule on average; and (b) half-esters of polycarboxylic acids with polyether-polyols that contain at least one free carboxylic acid group per molecule and a double bond;

wherein the constituents, (a) and (b) are employed in the back layer (III) in a weight ratio of 0.75:1 to 2.375:1.

18. The planar structure according to claim 17, wherein up to 10 weight percent of filler is present in the coating compound for the mechanically foamed foam layer in the back layer (III), to the total amount of the epoxidized oil and half-ester.

19. The planar structure according to claim 17, wherein 39 to 100 weight percent of filler is present in the coating compound for a chemically foamed foam layer in the back layer (III), to the total amount of epoxidized oil and half-ester.

20. The planer structure according to claim 17, further comprising a protective layer (VI) of at least one unsaturated, hardenable lacquer material arranged above the cover layer (II), wherein the polymers or copolymers for the lacquer material are selected from the group consisting of polyacrylates, polymethacrylates, polyurethanes and mixtures thereof.

21. The planar structure according to claim 17, further comprising a compact or priming layer (IV) arranged between the carrier layer (I) and the cover layer (II), wherein a coating compound for the layer (IV) is manufactured from a combination of:

(a) epoxidized products of esters of unsaturated fatty acids having a chain length of $C_8$ to $C_{22}$ with multi valent aliphatic alcohols containing 2 to 6 carbon atoms and which contain more than one epoxy group per molecule on average; and (b) half-esters of polycarboxylic acids with polyether-polyols that contain at least one free carboxylic acid group per molecule and a double bond;

wherein the constituents (a) and (b) are employed in the compact or priming layer in a weight ratio of 0.92:1 to 3.15:1.

22. The planar structure according to claim 21, wherein a further compact or priming layer (IV) is arranged between the carrier layer (I) and the back layer (III).

23. The planar structure according to claim 21, wherein other processing-conditioned auxiliaries from the group of acrylates, polymethylmethacrylates, linseed oil, curing accelerators, foaming agents and kickers are present in the coating compounds in quantities up to 22 weight percent.

24. The planar structure according to claim 21, wherein the planar structure contains at least one compound of metal from the group consisting of Al, Li, Ca, Fe, Mg, Mn, Pb, Zn, Zr, Ce, Co, and mixtures thereof.

25. The planar structure according to claim 21, wherein at least one mineral filler from the group of chalk, barium sulfate, silicic acid, kaolin, talcum, saw dust, cork dust, glass, textile fibers, glass fibers, plant fibers is contained in the coating compounds or is worked into the coating compounds as fillers.

26. The planar structure according to claim 21, wherein polyethylene wax, Fischer-Tropsch hard paraffine, animal waxes, plant waxes or mineral waxes are employed as the hydrophobing agent.

27. The planar structure according to claim 21, wherein 13 to 74 weight percent filler, to the total amount of epoxidized oils and half-ester, is contained in the coating compound for the compact or priming layer (IV).

28. The planar structure according to claim 21, wherein 20 to 50 weight percent of filler, to the total amount of epoxidized oils and half-ester, is contained in the coating compound for the compact or priming layer (IV).

29. The planar structure according to claim 21, wherein a chemically foamed foam layer (V) for chemical embossing is arranged under the cover layer (II).

30. The planar structure according to claim 29, wherein 39 to 100 weight percent of filler, to the total amount of epoxidized oils and half-ester, is contained in the coating compound for the chemically foamed foam layer (V).

31. The planar structure according to claim 30, wherein 60 to 100 weight percent of filler, to the total amount of epoxidized oils and half-ester, is contained in the coating compound for the chemically foamed foam layer (V).

32. The planar structure according to claim 29, wherein up to 25 weight percent, to the total amount of epoxidized oils and half-ester, of foaming agent is contained in the coating compound for the chemically foamed foam layer (V).

33. The planar structure according to claim 29, wherein up to 15 weight percent, to the total amount of epoxidized oils and half-ester, of foaming agent is contained in the coating compound for the chemically foamed foam layer (V).

34. The planar structure according to claim 29, wherein a protective layer (VI) of unsaturated, hardenable lacquer systems is arranged above the cover layer (II), wherein the polymers or copolymers for the lacquer systems are selected from the group consisting of: polyacrylates, polymethacrylates, polyurethanes and mixtures thereof.

35. The planar structure according to claim 1, further comprising a compact or priming layer (IV) arranged between the carrier layer (I) and cover layer (II), wherein coating compound for the compact or priming layer (IV) is manufactured from a combination of:

(a) epoxidized products of esters of unsaturated fatty acids having a chain length of $C_8$ through $C_{22}$ with multi valent aliphatic alcohols containing 2 through 6 carbon atoms and which contain more than epoxy group per molecule on average; and (b) half-esters of polycarboxylic acids with polyether-polyols that contain at least one free carboxylic acid group per molecule and a double bond;

wherein the constituents (a) and (b) are employed in the compact or priming layer (IV) in a weight ratio of 0.92:1 to 3.15:1.

36. The planar structure according to claim 1, wherein the structure is a floor covering or tile.

* * * * *